United States Patent [19]

Houlberg

[11] 4,326,613
[45] Apr. 27, 1982

[54] SOLENOID ACTIVATED SPRING CLUTCH

[75] Inventor: Don M. Houlberg, Port Washington, Wis.

[73] Assignee: Joerns Furniture Company, Stevens Point, Wis.

[21] Appl. No.: 147,139

[22] Filed: May 6, 1980

[51] Int. Cl.³ .................. F16D 13/08; F16D 27/12
[52] U.S. Cl. .................... 192/21; 192/35; 192/48.9; 192/81 C; 192/84 T
[58] Field of Search ............ 192/21, 26, 35, 40, 192/48.2, 48.9, 81 C, 84 T, 79, 0.084

[56] References Cited

U.S. PATENT DOCUMENTS

| 459,042 | 9/1891 | King et al. ............... 192/81 C |
|---|---|---|
| 1,886,692 | 11/1932 | Kapitza et al. ............ 192/84 T X |
| 2,434,480 | 1/1948 | Anderson ................. 188/1 |
| 2,568,808 | 9/1951 | Johanson ................. 268/59 |
| 2,660,899 | 12/1953 | McCammon ............... 74/337 |
| 2,930,463 | 3/1960 | Dodge et al. ............. 192/81 |
| 3,026,739 | 3/1962 | Hungerford ............... 74/368 |
| 3,177,995 | 4/1965 | Mason .................... 192/84 TX |
| 3,216,392 | 11/1965 | Shimanckas ............... 115/41 |
| 3,228,497 | 1/1966 | Shneider ................. 192/40 X |
| 3,232,399 | 2/1966 | Harned et al. ............ 192/103 |
| 3,313,170 | 4/1967 | Lacy et al. .............. 192/48.2 X |
| 3,798,684 | 3/1974 | Benoit et al. ............ 5/66 |
| 3,934,690 | 1/1976 | Janning .................. 192/84 T |
| 3,974,902 | 8/1976 | Wahlstedt et al. ......... 192/84 T |

FOREIGN PATENT DOCUMENTS

| 2622538 | 4/1977 | Fed. Rep. of Germany ........ 192/26 |
|---|---|---|
| 139788 | 3/1920 | United Kingdom .............. 192/40 |

*Primary Examiner*—Rodney H. Bonck
*Attorney, Agent, or Firm*—Price, Heneveld, Huizenga & Cooper

[57] ABSTRACT

A wrap-down spring clutch includes a drum and a spring which are selectively engaged by a solenoid. The solenoid has a coil, which when energized, extends a ferromagnetic plunger. When the coil is energized the plunger is extended out against the spring and urges the same into frictional engagement with the drum. The drum is also ferromagnetic, such that the activation of the coil simultaneously magnetizes the plunger, and creates a magnetic attraction between the plunger and the drum which further urges the plunger against the spring and the drum to produce a wrap-down pressure which effects quick and secure clutch engagement.

13 Claims, 4 Drawing Figures

SOLENOID ACTIVATED SPRING CLUTCH

BACKGROUND OF THE INVENTION

The present invention relates to clutches, and in particular to a solenoid activated spring clutch.

Wrap-down spring clutches are used in a wide variety of applications, such as the adjustable hospital bed disclosed in my copending U.S. patent application Ser. No. 147,217, filed May 6, 1980, entitled DRIVE UNIT FOR ADJUSTABLE BEDS, which is hereby incorporated by reference. These spring clutches typically include a driving drum with a coil spring connected therewith, a friction or a clutch drum which is positioned concentrically within the spring, and an activator, such as clamping arms, or the like, which selectively cause the free end of the spring to wrap constrictingly down against the periphery of the clutch drum for transmitting rotation from the driving drum to the clutch drum.

Heretofore, activators for such clutches have been unable to both engage quickly and initiate a secure spring wrap-down which would not inadvertently slip during power transmission. These clutches also tend to intermittently engage and disengage or "chatter" during spring wrap-down. The forces which are typically required to initiate and sustain clutch engagement in such devices are very high in comparison to the power which the clutch is capable of transmitting, thereby affording a rather inefficient and unattractive clutching mechanism. Further, these spring clutches have a complicated design with the internally located activators, such that both the manufacturing and maintenance costs are relatively high.

SUMMARY OF THE INVENTION

One aspect of the present invention is to provide a solenoid activator for a spring clutch. The clutch includes a drum selectively and constrictingly engaged by an associated spring, and a solenoid connected with the clutch. The solenoid has a coil and a plunger which extends and retracts in response to the activation of the coil. Energizing the coil extends the plunger free end abuttingly against the spring, and urges the spring into frictional engagement with the drum. The plunger and the drum are both ferromagnetic, such that the activation of the coil simultaneously magnetizes the plunger, and creates a magnetic attraction between the plunger and drum which further urges the plunger against the spring and the drum to provide a dual wrap-down pressure for effective clutch engagement.

In another aspect of the present invention, a double wrap-down spring clutch arrangement is provided, wherein both spring clutches are solenoid activated. A lock out mechanism is preferably provided to deactivate one of the solenoids when the other is energized, so as to prevent both clutches from being engaged at the same time. Also, a switch for activating and deactivating the clutch drive motor is connected with the solenoids, such that energizing either one of the solenoids automatically closes the switch and starts the motor.

The principle objects of the present invention are to provide a solenoid activated spring clutch having both a quick response and secure engagement; to provide a solenoid activated spring clutch having an uncomplicated design for reduced manufacturing costs; to provide a solenoid activated spring clutch wherein energizing the solenoid coil extends and magnetizes the solenoid plunger for increased wrap-down pressure at reduced lock-down power requirements; to provide a solenoid activated spring clutch which does not chatter during normal operation; to provide a solenoid activated spring clutch wherein the solenoid is isolated from the remainder of the clutch for ease of assembly and maintenance; to provide a solenoid activated spring clutch wherein the solenoid is connected with an external portion of the clutch, such that the solenoid can be removed and replaced without interfering with either the clutch mechanism or the motor drive train; to provide a solenoid activated spring clutch wherein the solenoid is mounted in a manner which provides the user with a visual indication of the clutch's operation and position; to provide a dual solenoid activated spring clutch arrangement which includes an output shaft that rotates either clockwise or counterclockwise from a unidirectional rotating input; and to provide a solenoid activated spring clutch which is efficient in use, economical to manufacture, capable of a long operating life, and particularly well adapted for the proposed use.

These and many other important features, advantages, and objects of the present invention will be further understood and appreciated by those skilled in the art by reference to the following written specification, claims, and appended drawings.

DETAILED DESCRIPTION OF THE PREFERRED EMBODIMENTS

Figure 1:
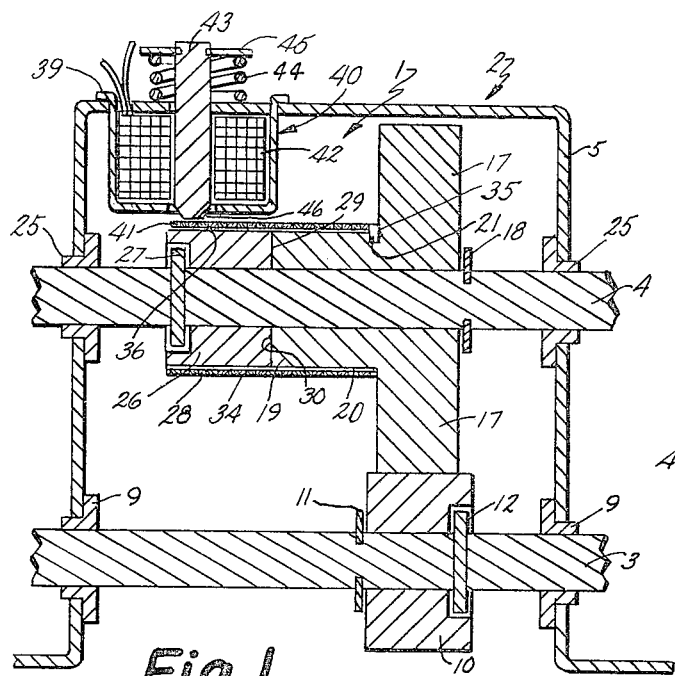
FIG. 1 is a cross-sectional view of a solenoid activated spring clutch embodying the present invention, shown in a disengaged condition.

For purposes of description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, except where expressly specified to the contrary.

The reference numeral 1 (FIG. 1) generally designates a solenoid activated spring clutch embodying the present invention. In the illustrated example, spring clutch 1 is shown in conjunction with a power transmission device 2 comprising an input shaft 3 and an output shaft 4 which are rotatably mounted in a parallel relationship in a housing 5. It is to be understood however, that spring clutch 1 may be used in conjunction with a wide variety of different power transmission arrangements, and that the specific arrangement disclosed herein is not to be interpreted as limiting, except insofar as expressly stated in the appended claims.

The illustrated input shaft 3 is rotatably mounted in housing 5 by end bearings 9, and a spur gear 10 is connected at a medial portion of the shaft for rotation therewith. The illustrated gear 10 is attached to input shaft 3 by a snap ring 11 and pin 12. Gear 10 meshes with and rotates a mating spur gear 17, which is mounted for free rotation on output shaft 4 by a snap ring 18. Spur gear 17 includes a hub portion 19, having a cylindrical exterior surface 20 and a notch 21 disposed in the neck portion of the gear adjacent the gear wheel for purposes to be described in greater detail hereinafter.

The output shaft 4 is rotably mounted in housing 5 by end bearings 25, and a friction or clutch drum 26 is attached to shaft 4 by a pin 27 and rotates therewith. Clutch drum 26 has a cylindrically shaped exterior surface 28 which is substantially coextensive and concentric with the outer surface 20 of gear hub 19. The interior end 29 of drum 26 abuts the end 30 of gear hub 19, and is adapted for sliding engagement therebetween. The clutch drum 26 is ferromagnetic, and is preferably constructed of a case hardened, oil filled sintered iron, which provides reduced wear while maintaining secure clutching action. The gear hub 19 is preferably constructed of a similar material. In the illustrated structure, the exterior surfaces 28 and 20 are hard, smooth, and form a substantially continguous, uninterrupted cylindrical surface.

A coil spring 34 (FIGS. 1 and 2) is positioned over gear hub 19 and clutch drum 26, and is adapted to be wrapped down constrictingly over the outer periphery of the hub and drum to selectively engage the same and transmit rotational motion therebetween. One end of spring 34 includes a tang 35 which is positioned in hub notch 21, thereby interconnecting the same, such that spring 34 rotates with spur gear 17. The illustrated spring 34 is a flat wire spring which is wound to a diameter slightly greater than the outside diameter of the clutch drum and gear hub, so as to form a small, annularly shaped gap 36 therebetween to insure clearance between the spring and the clutch drum such that in the disengaged condition, there is no appreciable drag between these parts when the spring is rotated. Spring 34 is preferably ferromagnetic, for purposes to be described in greater detail hereinafter.

A solenoid 40 is mounted in housing 5, and is adapted to engage the free end 41 of spring 34 to initiate the clutching action. Solenoid 40 includes an annularly shaped, wire winding or coil 42 having a slug or plunger 43 slideably mounted in the center of the coil. Plunger 43 is ferromagnetic and rod shaped, and includes a frustroconically tapered free end 46. The plunger may be constructed from magnetic metals, such as iron or the like, and in the illustrated structure, is made from cold rolled steel. Solenoid 40 is attached to the housing 5, with plunger 43 oriented in a generally radial direction with respect to spring 34 and clutch drum 26. In this example, solenoid 40 is mounted on the inside surface of housing 5 by fasteners such as tangs 39, and may be easily removed and replaced. Since solenoid 40 is not physically connected with spring 34, clutch drum 26, shaft 4, or any other part of the drive train or operating clutch elements, assembly and maintenance of the device is improved.

Figure 2:
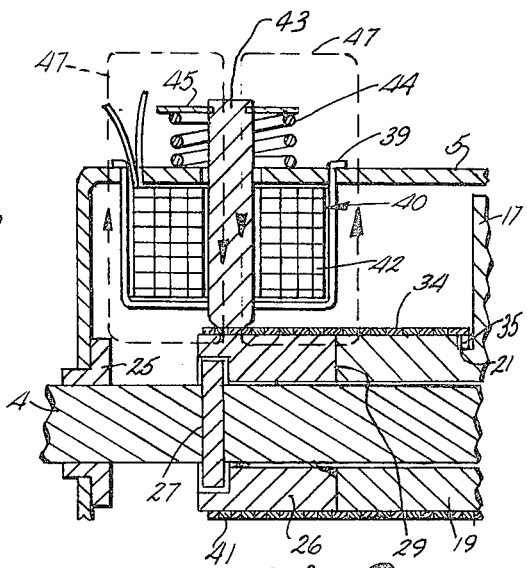
FIG. 2 is an enlarged fragmentary cross-sectional view of the spring clutch, shown in an engaged condition, with magnetic flux lines illustrated in phantom.

A spring 44 is connected with plunger 43 by a retainer 45, and normally holds plunger 43 in a retracted position, as shown in FIG. 1. Manipulation of plunger 43 and spring 44 on the outside of housing 5 provides a visual indication of the clutch position. When coil 42 is energized, the magnetic flux developed by the coil pushes plunger 43 outwardly in an extended position due to the eccentricity of the two parts' magnetic centers. The free end 46 of the plunger abuts the outer surface of the free end of spring 34, pushes the rotating spring free end against the clutch drum 26 thereby closing gap 36 at that location, and continuously urges the spring into frictional engagement with the clutch drum. The activation of coil 42 simultaneously magnetizes the plunger 45, thereby creating a magnetic attraction between the plunger and the clutch drum 26, which further forces the plunger against the spring and the drum to provide a dual wrap-down pressure which effects rapid and secure clutch engagement. When plunger 43 abuts the ferromagnetic spring 34, as illustrated in FIG. 2, a conducting path or electromagnetic circuit is completed, and magnetic flux lines, such as those noted by the reference numeral 47 are generated. The magnetic attraction between the plunger and the clutch drum has been found to be several times greater than the expulsion force of the coil acting on the plunger. Hence, in the present device, relatively low power is required to engage the clutch in a manner which enables the clutch to transmit relatively high loads.

Spring 34 is wrapped in a direction opposite to the direction of rotation of the spring and associated gear. The fixed end 35 of spring 34 rotates with gear 17, and clutch drum 26 remains substantially stationary until such time as the spring tenses and wraps about the outer surfaces of the clutch drum and gear hub, as shown in FIG. 2, so as to operably interconnect the same and transmit rotational power from the input shaft to the output shaft. Spring wrap-down is achieved by energizing coil 42, thereby extending plunger 43 outwardly into engagement with the free end of spring 34. The spring free end will typically continue to rotate a relatively small arcuate measure until complete, or at least more complete wrap-down is accomplished. The abutting action of plunger 43 causes the development of frictional forces which act on both sides of the spring and effect spring wrap-down. The contact between plunger 43 and spring 34 produces a frictional force which acts on the exterior side of the spring, and abutment between the spring and drum 26 causes a frictional force which acts on the interior side of the spring. The electromagnetic circuit produces attraction between all three of the clutch elements (i.e., plunger 43, spring 34 and drum 26), thereby substantially increasing these frictional forces, so as to effectively eliminate clutch chatter during the initial stages of spring wrap-down and insure smooth and positive clutch engagement. After spring 34 begins to wrap down onto clutch drum 26, the frictional forces developed therebetween increase proportionately as the spring continues to wrap to the fully wrappen position, wherein the clutch is engaged. Solenoid 40 remains energized for as long as the clutch is engaged. As the output shaft 4 rotates, spring 34 slidingly rotates beneath the free end 41 of plunger 43. The plunger free end 46 is preferably case hardened to reduce wear at the point of contact between the plunger and the spring.

When the solenoid coil 42 is deactivated, the plunger 43 is thereby demagnetized, and spring 44 raises the plunger free end 46 away from the free end 41 of the spring 34. By releasing the plunger applied forces which act on the free end of the spring, the frictional forces which are developed between the spring and the clutch drum are no longer sufficient to maintain engagement of the clutch, such that the spring 34 automatically expands to its normal nonengaged position about clutch drum 26.

Figure 3:
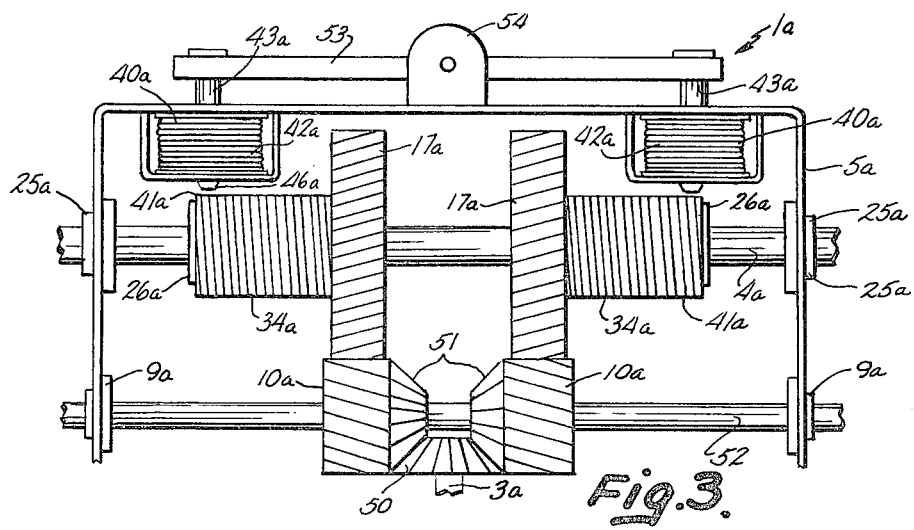
FIG. 3 is an elevational view of another embodiment of the present invention.

The reference numeral 1a (FIG. 3) designates another embodiment of the present invention having a double wrap-down spring clutch arrangement. Since the clutch arrangement 1a is similar to the previously described spring clutch 1, similar parts appearing in FIGS. 1-2 and 3 respectively are represented by the same, corresponding reference numeral, except for the suffix "a" in the numerals of the latter. In arrangement 1a, input shaft 3a is disposed perpendicular to the output shaft 4a, and is driven by a unidirectional rotary motor (not shown). Input shaft 3a drives a bevel gear 50, which in turn meshes with inwardly disposed beveled faces 51 of a pair of gears 10a, and rotates the same in opposite directions on idler shaft 52. Gears 10a are in turn meshed with a pair of clutch gears 17a on output shaft 4a, and rotate the same freely thereon in opposite directions. Each gear 17a includes a clutch drum 26a and a clutch spring 34a associated therewith in substantially the same configuration as discussed hereinabove in conjunction with spring clutch 1. Since the spring clutches are unidirectional in nature, but mounted in reverse orientation to each other, the left and right hand springs 34a (as viewed in FIG. 3) are wrapped in the same direction. Thus all parts of the left and right hand clutches are identical. Solenoids 40a located above the free ends 41a of clutch springs 34a, and are alternatively activated so as to selectively rotate output shaft 4 in either a clockwise or a counterclockwise direction. The upper ends of the coil plungers 43a are interconnected by a rocker arm 53 which is pivotally mounted on the upper surface of housing 5a by a bracket 54 at the medial portion of the arm. When one of solenoids 40a is energized to initiate engagement of the associated clutch, the plunger of the other solenoid is further retracted by the see-saw action of the rocker arm 53, thereby preventing both clutches from being engaged at the same time. Further, when the activated clutch is de-energized, the balanced weight arrangement of the rocker arm 53 and plungers 43a returns the solenoid plungers to their normal position, without the aid of separate return springs.

Figure 4:
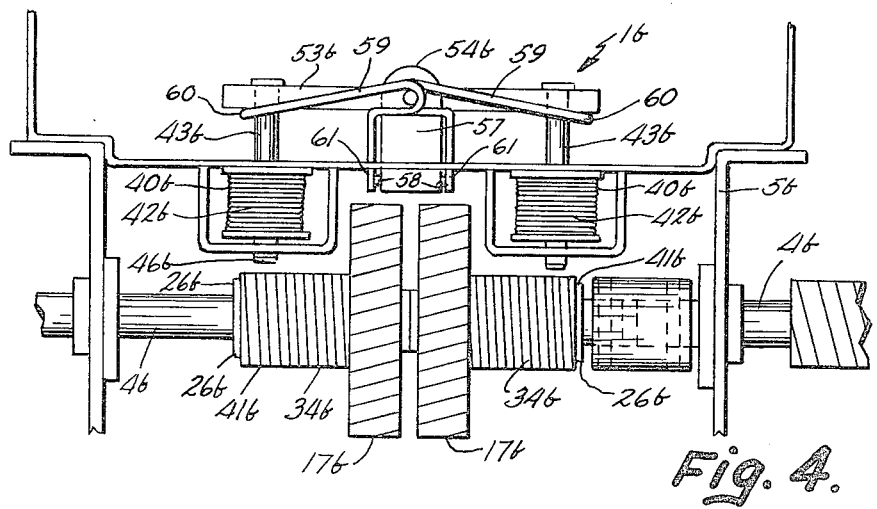
FIG. 4 is an elevational view of yet another embodiment of the present invention.

The reference numeral 1b (FIG. 4) generally designates yet another embodiment of the present invention having a switch for automatically activating a clutch drive motor (not shown). Since the clutch arrangement is similar to the previously described embodiments 1 and 1a, similar parts appearing in FIGS. 1-2, 3 and 4 respectively are represented by the same, corresponding reference numeral, except for the suffix "b" in the numerals of the latter. The gear 17b are driven in opposite directions on the output shaft 4b by suitable means, preferably a unidirectional rotary motor (not shown). Solenoids 40b are alternatively activated to engage the associated clutch and drive the output shaft 4b in either a clockwise or a counterclockwise direction. The rocker arm 53b prevents both solenoids 40b from contacting or engaging their associated clutches at the same time, as such action would instantaneously lock up the drive train and stall the motor. A switch 57 is provided for activating and deactivating the drive motor, and is operably connected with the solenoids 40b in a manner such that energizing either one of the solenoids automatically turns on the motor. In the illustrated example, switch 57 is mounted on the upper portion of housing 5b, and includes a pair of contactors 58. Shaped wire members 59 are pivotally mounted in bracket 54b, and include one end 60 which is disposed under the rocker arm 53b at the outer end thereof, and the other wire end 61 engaged with an associated one of the switch contactors 58. When the left hand solenoid 40b is energized (as viewed in FIG. 4), left hand plunger 43b is extended, thereby rotating left hand wire 59 in a counterclockwise direction, and depressing left switch contactor 58, which closes switch 57 and turns the drive motor on. The rotation of rocker arm 53b simultaneously retracts the right hand solenoid plunger 43b, and prevents the same from being engaged at the same time as the left hand plunger. Activation of the right hand solenoid is achieved in a similar fashion, and causes the output shaft 4b to rotate in an opposite direction.

In the foregoing description, it will be readily appreciated by those skilled in the art that many modifications may be made to the invention without departing from the concepts disclosed herein. Such modifications are to be considered as included in the following claims unless these claims by their language expressly state otherwise.

The embodiments of the invention in which an exclusive property or privilege is claimed are defined as follows:

1. In a wrap-down spring clutch having a clutch drum selectively and constrictingly engaged by an associated clutch spring, the improvement comprising:
   a solenoid connected with said clutch and having a coil, and a plunger with a free end which extends and retracts in response to energizing the coil; and wherein
   said drum and said plunger are ferromagnetic, whereby energizing said coil extends the plunger free end abuttingly against said spring and urges said spring into frictional engagement with said drum, and simultaneously magnetizes said plunger, thereby creating a magnetic attraction between said plunger and said drum which further urges said plunger against said spring and said drum to provide dual wrap-down pressure for effective clutch engagement.
2. A clutch as set forth in claim 1, wherein: said spring is ferromagnetic.
3. A clutch as set forth in claim 1, wherein: said plunger is oriented radially with respect to said spring and said drum.
4. A clutch as set forth in claim 1, including: resilient means urging said plunger into a normal, disengaged position.
5. A clutch as set forth in claim 1, wherein: said plunger is constructed of cold rolled steel.
6. A clutch as set forth in claim 1, wherein: said solenoid remains energized during an engaged clutch condition, wherein said spring rotates in a slidingly abutting fashion under said plunger free end.
7. A clutch as set forth in claim 6, wherein: said plunger free end is case hardened to reduce wear without substantially decreasing the magnetic attraction between said plunger and said drum.
8. A clutch as set forth in claim 7, wherein: said spring is ferromagnetic for increased magnetic attraction between said plunger and said drum.
9. A clutch as set forth in claim 8, wherein: said drum is constructed from a case hardened, oil-filled, sintered iron.
10. A clutch as set forth in claim 1, including:
    a switch for activating and deactivating a drive motor for said clutch; and
    means for operably connecting said switch with said solenoid, whereby energizing said solenoid automatically closes said switch for activating the motor, and deenergizing said solenoid automatically opens said switch for deactivating the motor.

11. In a double wrap-down spring clutch arrangement having a pair of clutch drums selectively and constrictingly engaged by associated clutch springs, wherein each clutch is alternatively engaged to reverse the direction of rotation of an output shaft, the improvement comprising:

a pair of solenoids connected with said clutch arrangement and each including a coil and a plunger; each solenoid plunger having a free end which extends and retracts in response to energizing the associated coil; and wherein said drums and said plungers are ferromagnetic, whereby energizing a selected coil extends the associated plunger free end abuttingly against the associated spring and urges said associated spring into frictional engagement with said associated drum, and simultaneously magnetizes said associated plunger thereby creating a magnetic attraction between the associated plunger and drum which further urges said associated plunger against the associated spring and drum to provide dual wrap-down pressure for effective clutch engagement.

12. A clutch arrangement as set forth in claim 11, including:

means for preventing both clutches from being engaged at the same time.

13. A clutch arrangement as set forth in claim 12, including:

a switch for activating and deactivating a drive motor for said clutch arrangement; and means for operably connecting said switch with said solenoids, whereby energizing one of said solenoids automatically closes said switch for activating the motor.

* * * * *